E. C. HAMILTON.
BABY CARRIAGE.
APPLICATION FILED DEC. 3, 1910.
1,011,776.
Patented Dec. 12, 1911.
3 SHEETS—SHEET 1.
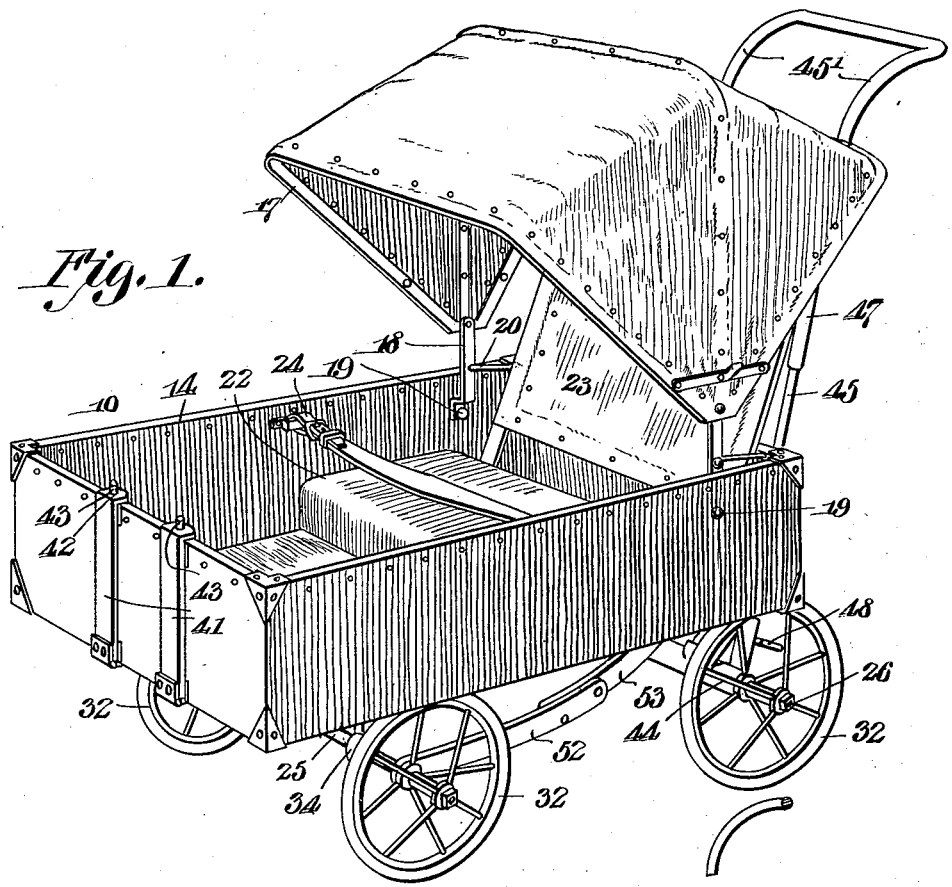
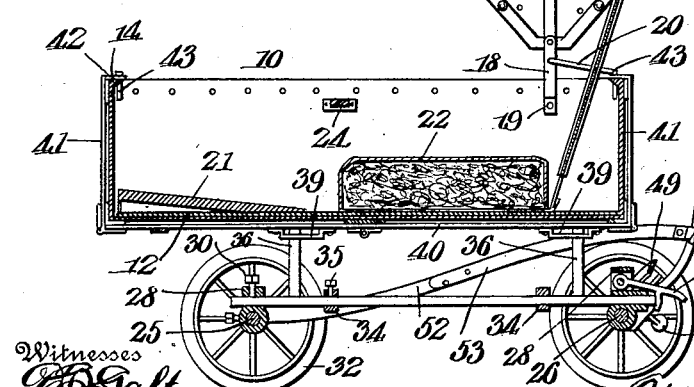

E. C. HAMILTON.
BABY CARRIAGE.
APPLICATION FILED DEC. 3, 1910.

1,011,776.

Patented Dec. 12, 1911.

3 SHEETS—SHEET 2.

Inventor
Edwin C. Hamilton

Witnesses

By Victor J. Evans
Attorney

E. C. HAMILTON.
BABY CARRIAGE.
APPLICATION FILED DEC. 3, 1910.
1,011,776.
Patented Dec. 12, 1911.
3 SHEETS—SHEET 3.
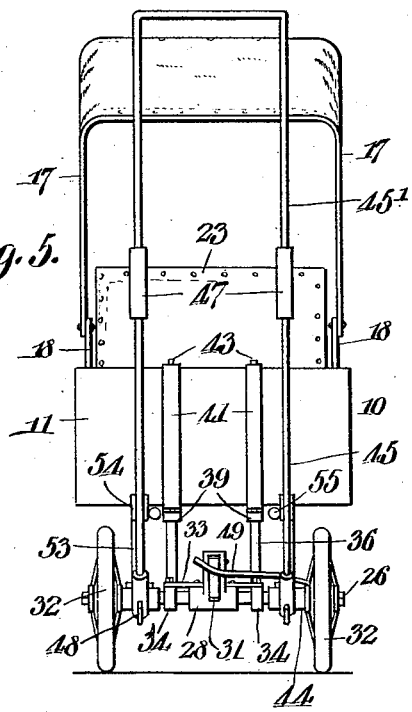
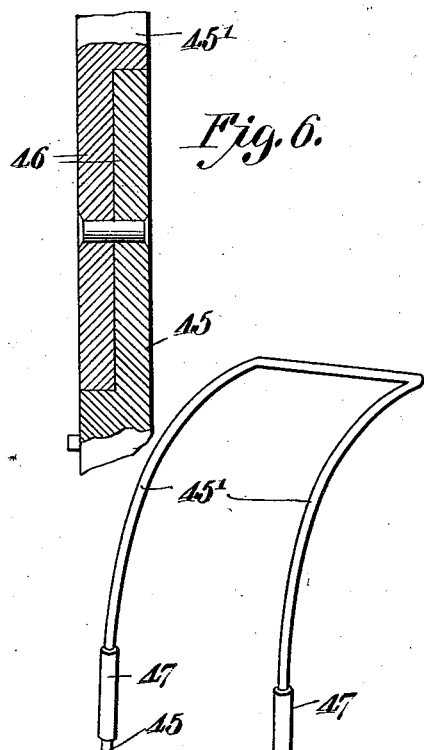
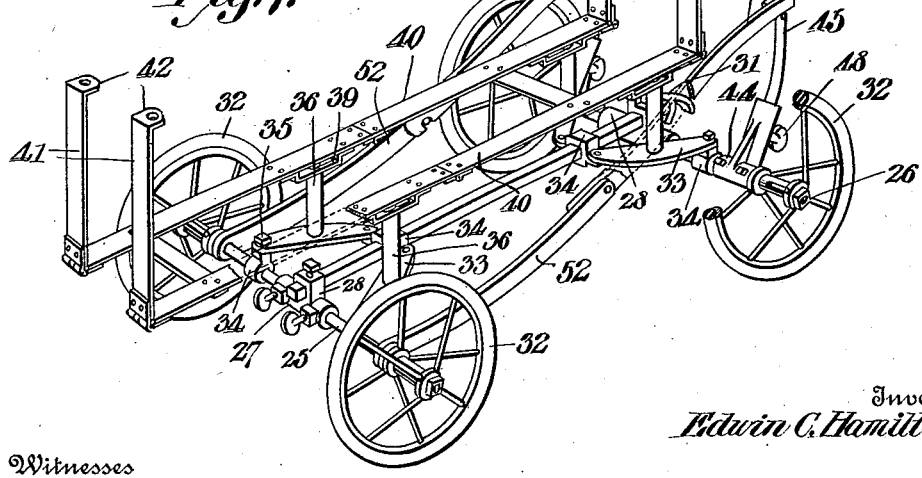
Witnesses
Inventor
Edwin C. Hamilton.
By Victor J. Evans
Attorney
COLUMBIA PLANOGRAPH CO., WASHINGTON, D. C.

UNITED STATES PATENT OFFICE.

EDWIN CHARLES HAMILTON, OF ANN ARBOR, MICHIGAN.

BABY-CARRIAGE.

1,011,776.    Specification of Letters Patent.    Patented Dec. 12, 1911.

Application filed December 3, 1910. Serial No. 595,401.

*To all whom it may concern:*

Be it known that I, EDWIN CHARLES HAMILTON, a citizen of the United States, residing at Ann Arbor, in the county of Washtenaw and State of Michigan, have invented new and useful Improvements in Baby-Carriages, of which the following is a specification.

The invention relates to a baby wagon or go-cart, and more particularly to the class of foldable go-carts, or carriages.

The primary object of the invention is the provision of a cart or wagon of this character in which the supporting wheels and canopy top may be folded into the body thereof, so as to bring the cart or carriage into compact form for easy transportation thereof, or converting it into luggage whereby the same may be carried from place to place in the hand of a person.

Another object of the invention is the provision of a cart or carriage of this character in which all of its adjunct parts may be conveniently and quickly folded and contained within the body, which latter may be closed, so as to have the appearance of a dress-suit case, thus permitting the same to be carried or shipped from point to point, or from one place to another, and which may be conveniently and easily extended for use in the ordinary well-known manner whenever desired.

A further object of the invention is the provision of a cart or carriage of this character which is simple in construction, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in the claims hereunto appended.

Figure 2:
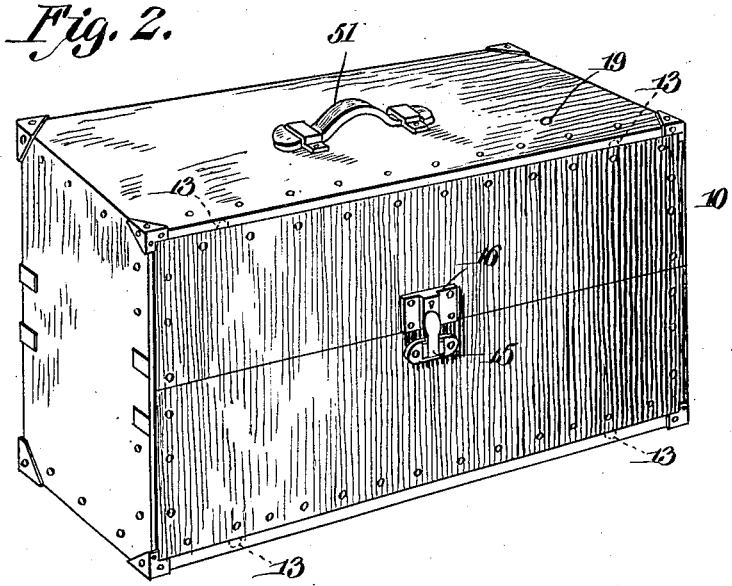
Figure 3:
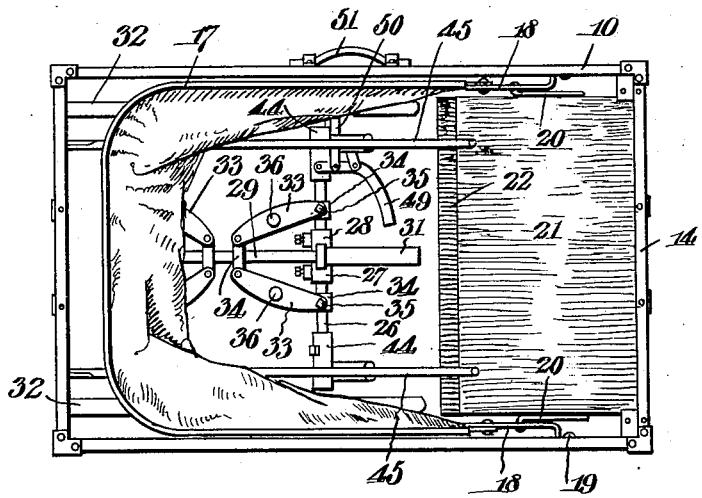

In the drawings: Figure 1 is a perspective view of a cart or carriage constructed in accordance with the invention, and shown in position for use. Fig. 2 is a perspective view of the cart or carriage when in folded position and ready for shipment or the carrying thereof from one point to another. Fig. 3 is a top plan view of the body with the removable sections detached. Fig. 4 is a vertical longitudinal sectional view through the view in Fig. 1. Fig. 5 is a rear end elevation thereof. Fig. 6 is a fragmentary enlarged sectional view through one of the foldable joints of the handle of the carriage or cart. Fig. 7 is a perspective view of the running gear of the carriage or cart with the body removed. Fig. 8 is a fragmentary side elevation of one of the body supporting posts, the same being drawn on an enlarged scale.

Similar reference characters indicate corresponding parts throughout the several views of the drawings.

Referring to the drawings by numerals, 10 designates a box-like case, preferably rectangular-shaped, and is faced on its outer and inner surfaces by a leather covering 11, the body of the case being constructed from any suitable material, and also its covering may be of any other suitable material. This case 10 is provided with a closing wall, comprising a pair of sections 12, each being formed with keeper lugs 13 adapted to engage with an inturned marginal flange 14 formed on the side and end walls of the said case, one section of the closing wall being provided with a locking hasp 15 of the usual well-known type used in dress-suit cases, while the other section is provided with a lock 16 of the said hasp, thus the hasp 15, when engaging the lock 16, will sustain the sections 12 in position for closing the case, for a purpose, as will be hereinafter more fully described.

Near one end of the case is mounted a canopy top comprising foldable bows 17, the same being pivotally connected in any ordinary manner to the supporting frame 18 of the top and having its ends connected to the side walls of the case 10 by means of pivots 19, the latter being mounted in the side walls of the case spaced a suitable distance from its top edge, so that the canopy top may be folded within the same. Pivotally connected to the frame 18 are swinging catches 20, the latter being adapted to engage in the adjacent end wall of the case 10 for sustaining the top against folding movement for the use of said top as a canopy.

Arranged within the case 10 are removable cushioned seats 21 and 22, the latter being provided with a hinged back-rest 23 which is adapted to be supported at the required inclination by bearing against one end wall of the case, and to afford a comfortable seat and back-rest for an infant when positioned within the casing.

Suitably connected within the case at one side wall thereof is a retaining strap 24, which latter is adapted to be detachably connected to the opposite side wall of the case when strapping in an infant within the case. It is of course to be understood that the back-rest 23 is adapted to be folded inwardly within the case and likewise the canopy top, for a purpose as will be hereinafter more fully described.

This case 10 is detachably supported by means of running gearing comprising two-part front and rear axles 25 and 26, respectively, the parts of the front and likewise the rear axle, being detachably fitted in couplings 27, the same being formed with central guide lugs 28 in which is slidably fitted a reach bar 29, one of said lugs being provided with a binding screw 30 adapted to engage the bar 29 to hold it in adjusted position, and upon adjustment of the bar 29, the distance between the front and rear axles may be varied, as desired. The other lug 28 is provided with a pivotal locking dog 31, which latter is adapted to fall by gravity into engagement with the end of the bar 29 for locking it against sliding movement in the said lug. When this dog 31 engages the bar 29, it sustains the axles separated from each other. Journaled upon the free ends of the axles 25 and 26 are the usual rubber tired traction wheels 32, the same being of any desirable size as may be required. Adjustably connected with the axles 25 and 26, and the bar 29 are hounds, each comprising flat links 33 pivotally secured to collars 34, a pair of which being adjustably fixed to the axles and the remaining one adjustably secured to the said bar 29. These collars carry the usual binding screws 35 for adjustably securing the same on the said axles and bar. Rising from the links 33 are posts or stems 36, each being formed with a head 37 provided with an annular groove 38, and engaged with the grooves in the said heads 37 are the keeper plates 39 of a foldable supporting frame comprising a plurality of hinged sections 40, carrying at their outer or free ends hinged straps 41, the latter being adapted to bear against the opposite ends of the case 10 when the same is superimposed upon the sections 40 of the supporting frame, the free ends of the straps 41 being bent to provide inturned ears 42 suitably perforated, through which are passed retaining pins 43 which are also detachably engaged in suitable sockets formed in the end walls of the case 10, thus when the pins 43 are engaged in the ears 42 and the sockets in the end walls of the case, 10, the latter will be securely fastened in position upon the supporting frame.

Adjustably mounted upon the rear axle 26 are T couplings 44 in which are detachably secured the ends of a push handle bar frame 45, comprising a handle bar 45' provided with hinged extension arms 46, the latter being fitted in the couplings 44, and the hinged joints between the arms and bar 45' are held against normal breaking by means of slidable sleeves 47 which are adapted to surround the said joints, but which may be shifted therefrom when it is desired to fold the handle bar frame. The ends of the arms 46 engaged in the couplings 44 are detachably secured within the latter by means of winged screws 48, so that upon detaching the handle bar frame from the said couplings 44 it may be folded by inwardly swinging the arms 46 connected to the handle bar 45', thus permitting the handle bar frame to be stored within the case.

Mounted upon one of the couplings 44 is a brake comprising a pedal 49, to which is pivotally connected a locking bolt 50, thus upon operating the pedal in one direction, the bolt will be thrown into the path of movement of the spokes of the adjacent wheel, thereby locking the running gearing, and on movement of the pedal in opposite direction, the bolt 50 will be moved out of the path of the spokes of the said adjacent wheel, permitting movement of the running gear.

The case 10 is provided with strap handle 51 which permits the same to be carried in the hand of a person, in like manner as a dress-suit case.

Connected with the front axle 25 and to the arms 46 of the handle bar frame are braces, each comprising a pair of pivotally connected bars 52 and 53, the latter being provided with a forked end 54 having threaded therein a binding screw 55 and this end 54 detachably embraces the arms 46 of the handle bar frame.

Assuming that the go-cart or carriage is in set-up position and that it is desired to fold the same, the case 10 is removed from the supporting frame by detaching the pins 43 from the ears 42 of the hinged straps 41 on the sections 40 of the said supporting frame, thus freeing the said case therefrom. The back-rest 23 is folded inwardly within the case 10 and likewise the canopy top. It is of course understood that the pair of sections 12 of the closure wall have been previously removed from the said case 10. The arms 46 of the handle bar frame are detached from the T couplings 44 on the rear axle of the running gearing whereupon the said arms 46 are folded, thus permitting the handle bar frame to be placed within the casing. Now, the dog 31 is disengaged from the bar 29 permitting the rear axle to be moved toward the front axle but prior to this the braces are folded and the supporting frame detached from the stems 36 rising from the hounds of the running gearing. The running gearing in its contracted condition is placed within the case 10. The supporting frame is folded and placed within the casing, and finally the sections 12 of the closing wall are positioned on the case 10, whereupon the entire go-cart is brought into compact form, so that the case may be carried in the hands or shipped, as may be desired.

What is claimed is:

1. The combination with a body, of a running gear comprising two-part front and rear axles, respectively, couplings detachably connecting the inner ends of the front and rear axles, central guide lugs rising from the said couplings, a reach bar slidably engaging in said guide lugs, a binding screw threaded in one of the guide lugs for locking engagement with the reach bar, a locking dog pivoted on the lug and engageable with the reach bar for sustaining the same in adjusted position, ground wheels journaled on the outer ends of the axles, hounds adjustably connected with the axles, and with the reach bar, posts fixed to and rising from the hounds and having heads, a foldable supporting frame having means detachably engaging the heads of the posts and adapted for detachably supporting the said body, a detachable handle bar connected with the rear axle, and foldable braces between the front axle and the said handle bar.

2. The combination with a body, of a running gear comprising two-part front and rear axles, respectively, couplings detachably connecting the inner ends of the front and rear axles, central guide lugs rising from the said couplings, a reach bar slidably engaging in said guide lugs, a binding screw threaded in one of the guide lugs for locking engagement with the reach bar, a locking dog pivoted on the lug and engageable with the reach bar for sustaining the same in adjusted position, ground wheels journaled on the outer ends of the axles, hounds adjustably connected with the axles, and with the reach bar, posts fixed to and rising from the hounds and having heads, a foldable supporting frame having means detachably engaging the heads of the posts and adapted for detachably supporting the said body, a detachable handle bar connected with the rear axle, foldable braces between the front axle and the said handle bar, the said foldable frame being provided with inturned perforated ends, and removable pins engaging the perforated ends and the body for detachably connecting the latter upon the supporting frame.

In testimony whereof I affix my signature in presence of two witnesses.

EDWIN CHARLES HAMILTON.

Witnesses:
OTTMAR H. LUTZ,
GROVER REAM.

Copies of this patent may be obtained for five cents each, by addressing the "Commissioner of Patents, Washington, D. C."